Feb. 9, 1965    G. P. T. KUHRDT    3,169,243
VARYING REPETITION RATE PULSE ECHO SYSTEM
Filed March 7, 1958    2 Sheets-Sheet 1

Inventor:
GÜNTHER KUHRDT
BY
PATENT AGENT

Feb. 9, 1965  G. P. T. KUHRDT  3,169,243
VARYING REPETITION RATE PULSE ECHO SYSTEM
Filed March 7, 1958  2 Sheets-Sheet 2

Inventor:
GÜNTHER KUHRDT
BY
PATENT AGENT

United States Patent Office 3,169,243
Patented Feb. 9, 1965

3,169,243
VARYING REPETITION RATE PULSE
ECHO SYSTEM
Günther P. T. Kuhrdt, Ulm (Danube), Germany, assignor, by mesne assignments, to Telefunken Patentverwertungs-G.m.b.H., Ulm (Danube), Germany
Filed Mar. 7, 1958, Ser. No. 719,880
Claims priority, application Germany, Mar. 9, 1957, T 13,334; Feb. 10, 1958, T 14,721
6 Claims. (Cl. 343—7.7)

The present invention relates to the elimination of "blind velocities" encountered in the operation of pulse echo apparatus for ascertaining the direction and the distance of moving targets only.

It has been known to transmit periodic pulses in focused beams of high frequency energy of the decimeter, centimeter or millimeter wave ranges and to receive the energy reflected from a target hit by this radiation at a receiver associated with the transmitter and to display this energy on a cathode ray tube screen. If the directional antenna for radiating this focused beam is caused to periodically rotate or oscillate and if the electron beam in the cathode ray tube is scanned in such a way, that it describes a trace in the same direction on the tube screen as the direction of each pulse when transmitted, the reflecting targets appear on the screen as light spots in a plan-position presentation with the trace being brightened at each respective reception of a target echo. Pulse-echo apparatus of the kind described are used as radar in airports to supervise the surrounding air space.

In this application and in other uses, it is undesirable that, in addition to the moving targets in the air, fixed targets on the ground, such as buildings or mountains, appear on the picture screen. The presence of the light spots representing targets in the air is obscured by the targets also represented on the screen. Efforts have been made to overcome the effect of "ground clutter" by the use of so-called moving-target-indication (MTI). In this system, phase differences between transmitted and received signals are used as the criterion for distinguishing between moving and fixed targets, said phase differences changing from pulse to pulse in the case of moving targets. The received signal is compared in a phase discriminator with the phase of the oscillations of a reference oscillator in order to ascertain the phase difference between transmitted and received signals at the high frequency, or preferably at an intermediate frequency, stage of the receiver. A signal will then appear at the output of the phase discriminator, whereby the amplitude and polarity of this signal is a function of the phase difference between the received signal and the reference oscillation. This signal is then fed to an amplitude comparing stage, both directly and also delayed by one pulse cycle, in such a way that, in this comparing stage, there always appears one pulse along with the immediately preceding pulse in phase opposition.

If the successive pulses represent a fixed target, their amplitudes are of the same magnitude so that their difference equals zero. Since a visible brightening is displayed on the screen of the cathode ray tube of the indicator only if this difference voltage surpasses a threshold value, no indication will appear if successive echo pulses have the same or approximately the same amplitude values. However, if the target moves at a velocity substantially different from zero in a direction which is radial with respect to the center location of the radar antenna, successive echo pulses will be discriminated to provide different amplitudes in accordance with larger or smaller phase differences resulting from movements of the target during the intervals between successive pulses. Such echo pulses generate an output voltage in the aforementioned amplitude-comparing stage, said voltage sufficiently brightening the electron beam and, thereby, causing the indication of the particular target on the screen.

This moving target indication system has the disadvantage that targets moving at certain radial velocities with respect to the antenna will not be indicated for the same reason that a stationary target is not indicated. The critical radial velocities at which this condition occurs are often referred to as "blind velocities," because the pulse echo apparatus appears to be so to speak "blind" with respect to a target moving at said radial velocities. The rates of these blind velocities $v_b$ bear a relation to the wave length $\lambda$ and the pulse repetition frequency $f_1$ which is represented by the equation $v_b = n.f_1.\lambda/2$, wherein $n$ equals 1, 2, 3, etc.

Radial velocities which are centered intermediately between two successive blind velocities are called optimum, because the sensitivity of pulse echo apparatus is a maximum at such velocities. The sensitivity will be lower the more the radial velocity approaches a blind velocity. The sensitivity becomes zero at a blind velocity.

It is an object of the present invention to avoid the low sensitivity at critical velocities and the great sensitivity drop in case the critical velocity values are approached.

It is another object of the invention to provide a method for suppressing fixed targets in a pulse echo system indicator in which each echo pulse, after passing through a phase discriminator, is compared with the next preceding pulse delayed by one pulse cycle and is indicated only if it is differentiated from the latter with respect to amplitude after discrimination.

It is a further object of the invention to provide in this kind of radar apparatus means whereby the interval between the transmitted pulses and the delayed intervals of the echo pulses are periodically changed to the same extent for the purpose of decreasing the number of the so-called blind velocities resulting in no indication.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
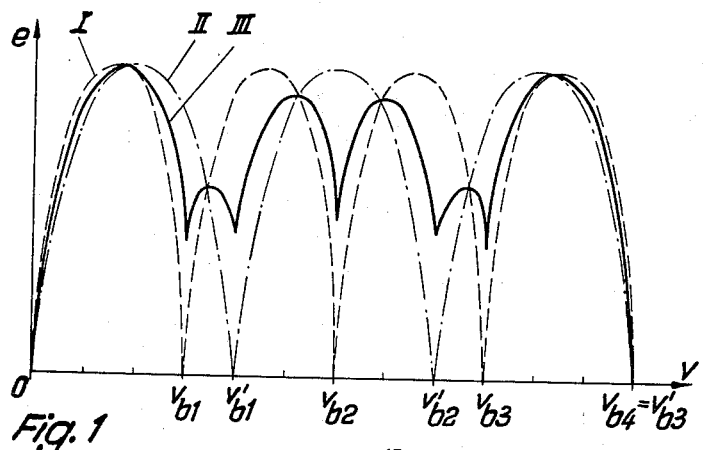
FIGURE 1 is a graphical illustration of the location of blind velocities for various pulse repetition frequencies.

In the diagram of FIGURE 1, the radial target velocities $v$ with the critical values $vb_1$, $vb_2$, etc. are plotted on the abscissa, while the sensitivity $e$ of the pulse echo apparatus is plotted on the ordinate, the "sensitivity" being defined as the degree to which the apparatus responds to incoming signals; specifically, the quotient of the power or other function of the output of the apparatus divided by the power or other function of its input. The dash-dash curve I shows the dependence of the sensitivity on the radial target velocity in case of an apparatus with moving target indication as described.

A dot-dash curve II indicates the sensitivity characteristic in such a device, wherein the pulse repetition frequency $f_1'$ is increased by ⅓. The critical velocities $v'b_1$, $v'b_2$, etc., are then likewise increased by ⅓ over the velocities $vb_1$, $vb_2$, etc. If the invention is applied, curve I alternates with curve II for successive pulses, resulting in the sensitivity curve III. The latter curve has zeros only at the intersections with the curves I and II. These remaining zeros can be readily placed in a velocity range where they are acceptable by selection of a suitable ratio between the two pulse sequences. Preferably, the zeros are placed in a range of very high radial velocity, because such high velocities will probably not occur in the practical use of such apparatus.

Figure 2:
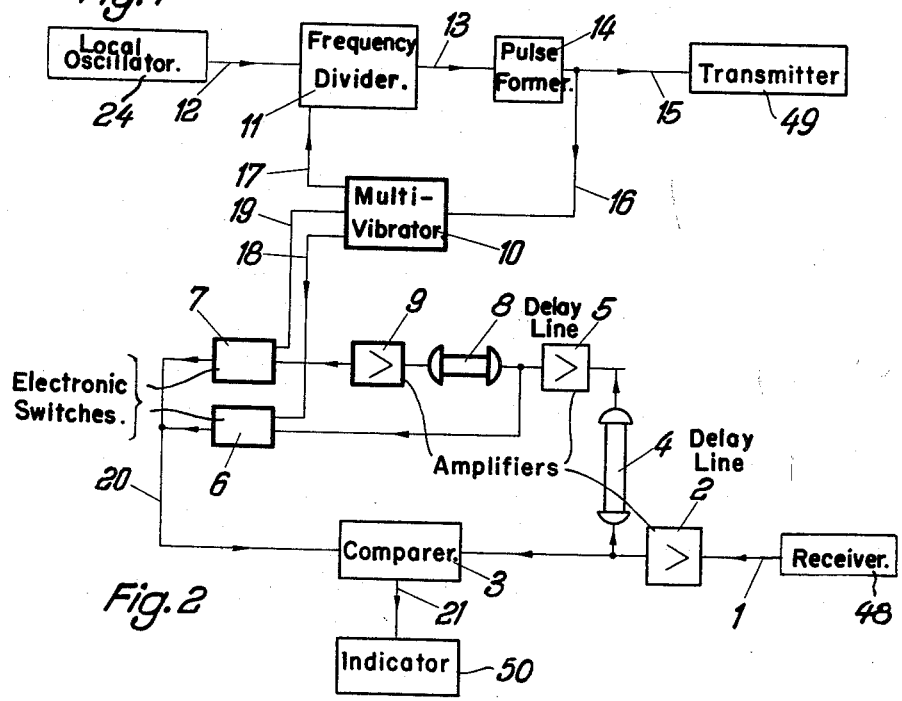
FIGURE 2 is a block diagram showing a combination of units according to the invention to be added to a radar system to eliminate blind velocities.

In FIGURE 2, components which are not necessary for the understanding of the invention, such as current sources, control members, etc., are omitted. The echo pulses supplied from the receiver 48 of the pulse echo apparatus are fed over the lead 1 to an amplifier 2. The signals thus amplified are fed from the output of the amplifier 2 to an amplitude comparing stage 3 and, simultaneously, to a delay line 4 which is designed in such a manner, that the time interval required by an echo pulse to pass through this delay line 4 equals the shorter of the pulse repetition intervals which occur alternately. Attenuation taking place in the delay line 4 is compensated for by an amplifier 5. The output of this amplifier 5 is, on the one hand, connected directly to a switching stage or electronic switch 6 and, on the other hand, to a switching stage or electron switch 7 via another delay line 8 and an amplifier 9. The transit time of the second delay line 8 equals the difference between the shorter and the longer pulse repetition intervals which occur alternately. The amplifier 9 is used to compensate for the attenuation caused by the delay line 8. The outputs of the switching stages 6 and 7 are shunted and connected to the input of the comparing stage 3 via a line 20.

The delay lines 4 and 8 may comprise, for example, liquid columns, such as of mercury, or solid bodies, such as quartz, known per se, whereby piezo-electric crystals are connected as electro mechanical transducers to the terminals of these liquid columns or solid bodies. The switching stages serve either to block the current path or to open it. Each of the switching stages may contain, for example, one pentode to the control grid of which the input is connected and to the anode of which the output is connected, while a switching voltage is fed to the suppressor grid.

A bistable multivibrator 10 is provided to periodically alternate the pulse repetition frequency and at the same time alternately open and block the respective switching stages 6 and 7. A frequency stable succession of control pulses is fed to a frequency divider, for example, a multivibrator 11, the frequency dividing ratio of which can be varied by biasing voltages, the frequency of these control pulses being an integral multiple of the repetition frequency of the pulses to be transmitted by the pulse-echo apparatus. The output voltage of the lower repetition frequency is fed, if necessary, to a pulse former 14 via a line 13, this pulse former supplying a succession of pulses controlling, on the one hand, the repetition frequency of the pulses emitted by the transmitter 49 via a line 15 and, on the other hand, being fed to the multivibrator 10 via a line 16. This multivibrator 10 is alternately triggered into one or the other stable state by this succession of pulses. As a result of this, D.C. voltages of different magnitude and/or polarity appear at the output of this multivibrator 10. These D.C. voltages are fed as biasing voltages to the frequency divider 11 via a line 17, causing the frequency dividing ratio to alternate between two values. For example, with one biasing voltage there is a frequency division by 4:1 and with another biasing voltage there is a division by 3:1 of the pulse repetition frequency, as will be explained in the following with reference to FIGURE 3.

Figure 3:
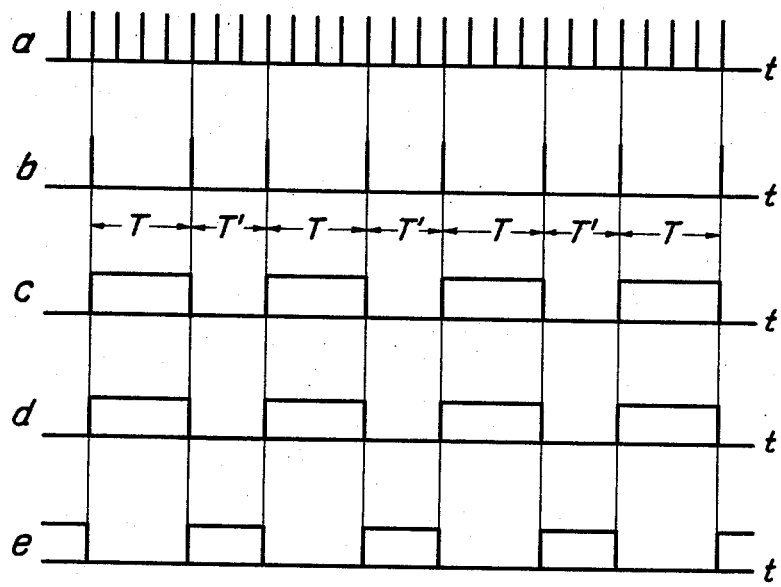
FIGURE 3 is a graphical representation including curves $a$, $b$, $c$, $d$ and $e$, which illustrate the relation of pulses to control voltages during repetition frequency division.

In the diagram $a$ of FIGURE 3, a pulse sequence from a pulse source 49 (FIGURE 2) is plotted with reference to time $t$, said pulse sequence being fed to the frequency divider 11 via the line 12. The frequency divider 11 provides a dividing factor of 4:1 as a result of the bias voltage (diagram $c$) derived from the multivibrator 10, so that two output pulses follow one another spaced by the distance T (see diagram $b$), these pulses being fed to the line 13, whereby a pulse repetition frequency $f_1$ equals $1/T$ is obtained. The multivibrator 10 is alternated to the other stable condition by the second output pulse furnishing a bias voltage by which the frequency divider 11 provides the dividing factor 3:1. Thus, the following output pulse appears at a time interval T' equals ¾ T corresponding to a pulse sequence frequency $f'_1$ equals 4/3 $f_1$. This pulse causes a return in the multibrator to the first stable condition, so that alternate output pulses with the spacings T and T' are produced (see diagram $b$). Consequently, the 3 to 4 ratio of the pulse sequence frequencies is obtained on which ratio the diagram of FIGURE 1 is based.

The control voltages derived from the multivibrator 10 are simultaneously fed via the lines 18 and 19 to the two switching stages 6 and 7 in phase opposition (see diagrams $d$ and $e$ of FIGURE 3) alternately causing one or the other of these switching stages to block or to open. As a result of this, an echo pulse, the successor of which will be expected after expiration of a time interval T, is fed from the amplifier 5 to the comparing stage 3 via the second delay line 8 and the switching stage 7, while the next echo pulse finds the switching stage 7 blocked and, therefore, travels to the comparing stage 3 via the switching stage 6, by-passing the second delay line 8. As a result of this, each of the echo pulses appears together with its predecessor in the comparing stage 3 in spite of the periodically changed pulse repetition frequency. The comparer 3 compares the phase and amplitude difference of the pulse voltages arriving by the first and second paths and derives, by superimposing these pulses, indications comprising the difference voltages which are connected via the line 21 to control the brightness of the electron beam of the cathode ray tube in the indicator 50.

Figure 4:
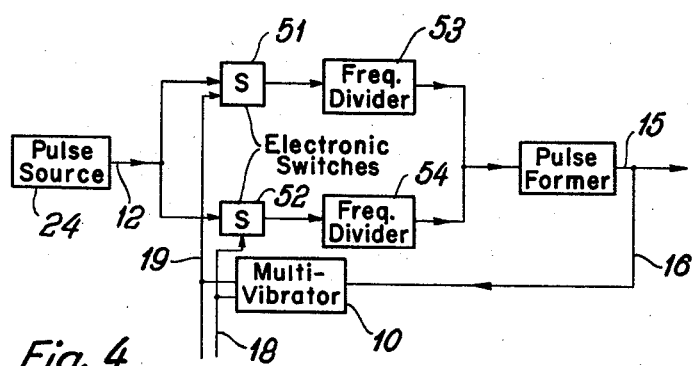
FIGURE 4 is a block diagram of an alternate embodiment of part of the system of FIGURE 2.

The circuit schematically shown in FIGURE 2 can be modified in various ways within the scope of this invention. For example, in place of the frequency divider 11, having a variable dividing ratio, two or more frequency dividers with different dividing ratios may be used, as in FIGURE 4, where dividers 53 and 54 are actuated by switches 51 and 52, respectively. Any other frequency dividing ratios than 3 to 4 may also be employed.

I claim:

1. In pulse echo apparatus including a radio-frequency pulse transmitter, a receiver and an indicator displaying the position of echos on a trace, means for selecting display echos from moving targets while suppressing echos from fixed targets, comprising pulse train generating means for producing at least two trains of pulses, the pulses in each train being differently spaced in time and controlling the transmission of radio frequency pulses; a phase comparer connected to the indicator and to the receiver by a first path; two different delay lines connected between said receiver and said comparer by a second path; switching means connected between said delay lines and said comparer and selecting the delay line passing the echo pulses, said switching means being connected to said pulse train generating means to select the degree of delay of the echo pulses by switching the delay lines so that in each alternate condition the delay is equal in time to the interval between radiated pulses, the comparer comparing the phase of the pulses arriving via the first and second paths and initiating an indication on said trace where the phases are different.

2. In an apparatus as set forth in claim 1, said delay lines being connected in series, and said switching means by-passing one of said delay lines when the pulses of the closer spacing are being passed through the second path.

3. The combination defined in claim 1 wherein said pulse train generating means includes a pulse source delivering pulses at a frequency which is an integer multiple of the frequency of each of said trains of pulses; pulse rate separating means for selecting one of said pulse trains from the delivered pulses, and actuating means connected to said separating means and to said switching means for simultaneously causing said separating means to select another pulse train and causing said switching means to select another delay line.

4. The combination as defined in claim 3 wherein said pulse rate separating means includes a frequency divider having two selectable ratios of division, and said actuating means supplies control voltages to select one of said ratios.

5. The combination as defined in claim 1 wherein said pulse train generating means includes a multivibrator which selects one of said two trains of pulses in each of its two states, said multivibrator actuating said switching means.

6. The combination as defined in claim 1 wherein said pulse train generating means includes a pulse source for delivering pulses at a frequency which is an integer multiple of the frequency of each of said trains of pulses, and pulse rate separating means including at least two frequency dividers having different ratios of division and each alternately becoming operative to select one of said trains of pulses.

References Cited in the file of this patent
UNITED STATES PATENTS

| | | |
|---|---|---|
| 2,451,822 | Guanella | Oct. 19, 1948 |
| 2,593,071 | Sunstein et al. | Apr. 15, 1952 |
| 2,646,561 | Emslie | July 21, 1953 |
| 2,659,080 | Benfield | Nov. 10, 1953 |
| 2,676,317 | Purington | Apr. 20, 1954 |
| 2,746,033 | Bachmann | May 15, 1956 |
| 2,765,446 | Martin | Oct. 2, 1956 |